(12) United States Patent
Jager

(10) Patent No.: US 8,453,942 B2
(45) Date of Patent: Jun. 4, 2013

(54) THERMOSTATIC SINGLE-UNIT FAUCET AND METHOD FOR MAKING SUCH A SINGLE-UNIT FAUCET

(75) Inventor: Frederic Robert Jager, Saint-Cheron (FR)

(73) Assignee: Vernet, Ollainville (FR)

( * ) Notice: Subject to any disclaimer, the term of this patent is extended or adjusted under 35 U.S.C. 154(b) by 712 days.

(21) Appl. No.: 12/678,542

(22) PCT Filed: Sep. 26, 2008

(86) PCT No.: PCT/FR2008/051718
§ 371 (c)(1),
(2), (4) Date: Mar. 17, 2010

(87) PCT Pub. No.: WO2009/050380
PCT Pub. Date: Apr. 23, 2009

(65) Prior Publication Data
US 2010/0206955 A1 Aug. 19, 2010

(30) Foreign Application Priority Data

Sep. 27, 2007 (FR) ...................................... 07 57902

(51) Int. Cl.
*G05D 23/185* (2006.01)
*G05D 23/13* (2006.01)
*B21D 51/16* (2006.01)

(52) U.S. Cl.
USPC ..................... 236/12.11; 236/12.1; 29/890.09

(58) Field of Classification Search
USPC .................. 236/12.1, 12.11, 12.16; 29/890.09
See application file for complete search history.

(56) References Cited

U.S. PATENT DOCUMENTS 5,979,777 A 11/1999 Ems
8,074,893 B2 * 12/2011 Mace ......................... 236/12.11

FOREIGN PATENT DOCUMENTS

| DE | 2409129 | 8/1975 |
| DE | 2703950 | 8/1978 |
| EP | 1128104 | 8/2001 |
| FR | 2569814 | 3/1986 |

* cited by examiner

*Primary Examiner* — Chen Wen Jiang
(74) *Attorney, Agent, or Firm* — Dowell & Dowell, PC

(57) ABSTRACT

The invention relates to a single-unit faucet that comprises a tubular faucet body (2) and a thermostatic cartridge (3) defining a pre-assembled assembly provided inside the faucet body and including a hollow shell (4) made of a plastic material, in which is provided a thermostatic means (5) for adjusting the temperature of a cold-fluid and hot-fluid mixture. In order to firmly and simply secure the shell in the faucet body, a rigid part (6) is provided between them, and is capable of movement along a movement axis (Z-Z) transverse to the longitudinal axis (X-X) of the faucet body, while being kinematically connected to the shell both in the direction of the axis of the faucet body and in rotation about said axis. The rigid part includes a bore (63) centred on the movement axis and opening on a face (62B) of the rigid part oriented towards the faucet body, in order to interact by screwing with the threaded rod (71) of a screw (7) for moving the rigid part until a bearing portion of said face is pressed against the lower face (2A) of the faucet body when the screw is inserted from outside the faucet body into a transverse through hole (21) of the faucet body, which is smaller than the head (72) of the screw.

10 Claims, 5 Drawing Sheets

THERMOSTATIC SINGLE-UNIT FAUCET AND METHOD FOR MAKING SUCH A SINGLE-UNIT FAUCET

The present invention relates to a thermostatic single-unit mixer and to a method of manufacturing such a mixer.

The invention applies in particular to the field of sanitaryware and is thus concerned with mixing faucets both for basins and for showers, for example, which allow an incoming stream of cold water and an incoming stream of hot water to the "mixed", that is to say combined, to form a single stream of water leaving at a temperature that is intermediate between the respective temperatures of the hot water and of the cold water.

Such single-unit mixers are said to be "thermostatic" when they allow the temperature of the mixed water to be regulated to a substantially constant and adjustable value, independently of the respective pressures and temperatures of the cold water and of the hot water and of the flow rate of the mixed water, within a certain range of pressures and flow rates. This thermostatic function is performed by ad hoc means which are essentially housed inside a hollow shell, thus advantageously forming a pre-assembled assembly that can be termed a "thermostatic cartridge" and which is fitted as a single piece inside the tubular external casing of the single-unit mixer. Examples of such a thermostatic cartridge and of a mixer incorporating this cartridge are given in FR-A-2 774 740.

In practice, it is necessary for the cartridge to be fixed firmly inside the mixer casing, in order to hold it in position reliably as water flows through the mixer. In the case of a cartridge shell made of metal, attachment by screws passing through the mixer casing guarantees a particularly robust connection. However, such metal-shell cartridges are appreciably more expensive than cartridges the shells of which are made of plastic, the use of which is therefore favored. Attaching cartridge shells made of plastic itself presents problems of mechanical integrity during service. Specifically, one known option is to secure to the plastic shell a metal insert that is used with a grub screw so that the cartridge is not fitted askew in the mixer casing. This solution allows the cartridge to be fixed quickly and easily into the mixer casing but, because there is no rigid connection between the insert and the mixer casing, it is unable to withstand high levels of stress, particularly those associated with the pressure of water in the mixer casing. Another known solution is to resort to more robust attached systems interposed between the mixer casing and the cartridge shell. However, these systems comprise a quantity of small components, making them more complicated to assemble with the rest of the single-unit mixer, and/or consist of components that are bulky and expensive: for example FR-A-2 774 740 proposes the use either of a large-sized threaded fastener which is screwed directly into the mixer casing, or a fork which is completely fitted transversely to the mixer casing, from outside the latter. Such more robust systems entail special arrangements for the mixer casing, such as a peripheral tapping with which to screw-fasten the aforementioned threaded fastener, or a wide slot for fitting the aforementioned fork, and mean that the cartridge has to be fitted into the mixer casing before a temperature-regulating knob is fitted, thus making assembling and maintaining the single-unit mixer more complicated.

It is an object of the present invention to propose a thermostatic single-unit mixer in which the attachment between the mixer casing and the plastic shell of the cartridge is both more robust in service and less complicated to achieve.

To this end, a subject of the invention is a thermostatic single-unit mixer as described hereinafter.

The concept underlying the invention is that of interposing the claimed rigid component between the mixer casing and the plastic shell of the cartridge: before the cartridge is attached to the mixer casing, this component is able to move along the axis of movement with respect to the cartridge while at the same time advantageously being incorporated into the latter so that it can be fitted into the casing of the mixer at the same time as this cartridge. The mobility of the rigid component is put to good use so that when the cartridge is fitted inside the mixer casing, it can be pressed firmly against the interior face of the mixer casing, under the action of the tightening of the screw introduced into its tapping. By tightening the screw the head of which is in abutment against the exterior face of the mixer casing, the connection between the moving component and the mixer casing is effectively made more rigid along the axis of movement and this, combined with the kinematic connection between the shell and the component both in the direction of the longitudinal axis of the mixer casing and in terms of rotation about the aforementioned axis, firmly immobilizes the shell with respect to the mixer casing. The rigid structure of the moving component ensures that the shell is immobilized effectively even if this component is pressed against the interior face of the casing of the mixer only on one side. The invention thus provides a robust attachment of the cartridge shell to the mixer casing inasmuch as this attachment is able to withstand the static pressure and the dynamic pressure phenomena, commonly known as "water hammer", within the single-unit mixer. Furthermore, the advantageous use of a single screw and/or of a temperature-regulating knob that is pre-assembled as one piece with the cartridge makes the single-unit mixer easier to assemble and to maintain. The cartridge can thus be fitted particularly quickly and economically, requiring no special tooling. As far as the mixer casing is concerned, the presence of the through-hole for the shank of the screw is a trivial modification. What is more, the rigid component and the screw are completely hidden inside the mixer casing, except for the head of the screw, which is advantageously countersunk and positioned in a region of the mixer casing that is not open to being viewed by the user, in order to ensure the esthetic appearance of the plumbing fittings incorporating the single-unit mixer according to the invention.

Further advantageous features of the thermostatic single-unit mixer according to the invention, considered in isolation or any technically possible combination, are described hereinafter.

Another subject of the invention is a method of manufacturing a thermostatic single-unit mixer as described hereinafter.

The method according to the invention makes it possible to manufacture a thermostatic single-unit mixer as defined above. As justified hereinabove and explained in detail hereinafter, this method is quick, economical and reliable.

The invention will be better understood from reading the description which will follow, given solely by way of example and made with reference to the drawings in which:

FIGS. 1 to 5 depict a thermostatic single-unit mixer 1 intended, for example, to be fitted to sanitaryware fittings, such as a basin or shower faucet.

The single-unit mixer 1 comprises, by way of main external component, a mixer casing 2 of tubular shape, running lengthwise about a central axis X-X. In the example considered in the figures, the mixer casing has a cross section of circular outline, centered on the axis X-X, and is open at both its longitudinal ends. For convenience, the remainder of the description is oriented with respect to the mixer casing 2, so that the term "interior" denotes a direction facing toward the axis X-X, while the term "exterior" denotes a direction in the opposite sense. Likewise, the terms "top" and "upper" denote a direction directed, along the axis X-X, toward one of the longitudinal ends of the mixer casing, namely the end facing toward the upper part of FIGS. 1, 2, 4 and 5, while the terms "bottom" and "lower" denote a direction in the opposite sense.

Figure 1:
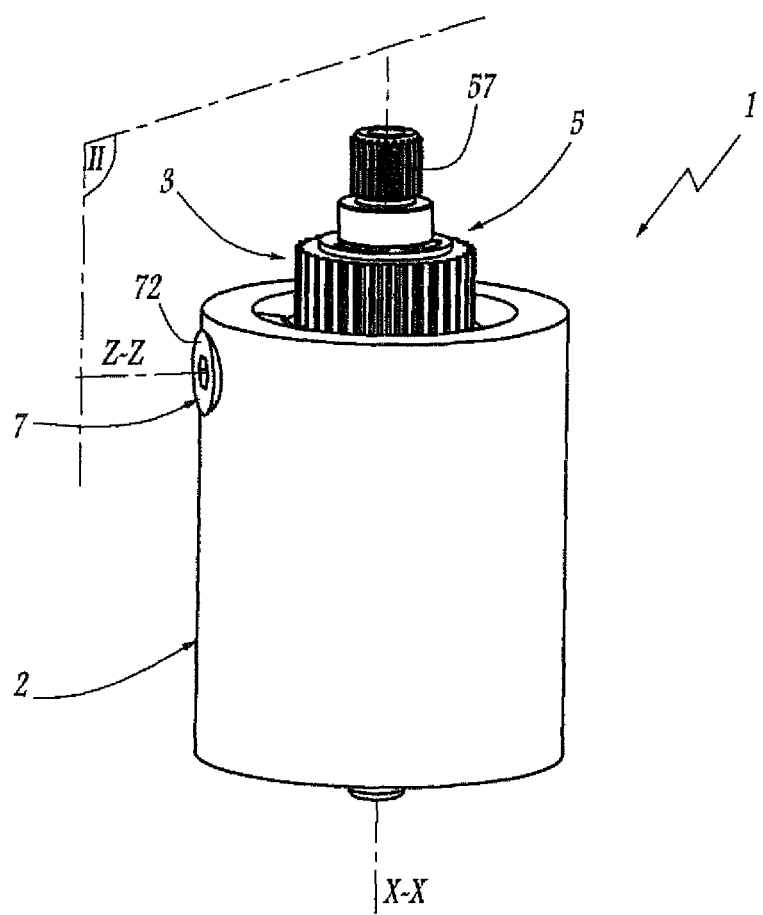
FIG. 1 is a schematic perspective view of a thermostatic single-unit mixer according to the invention.
Figure 2:
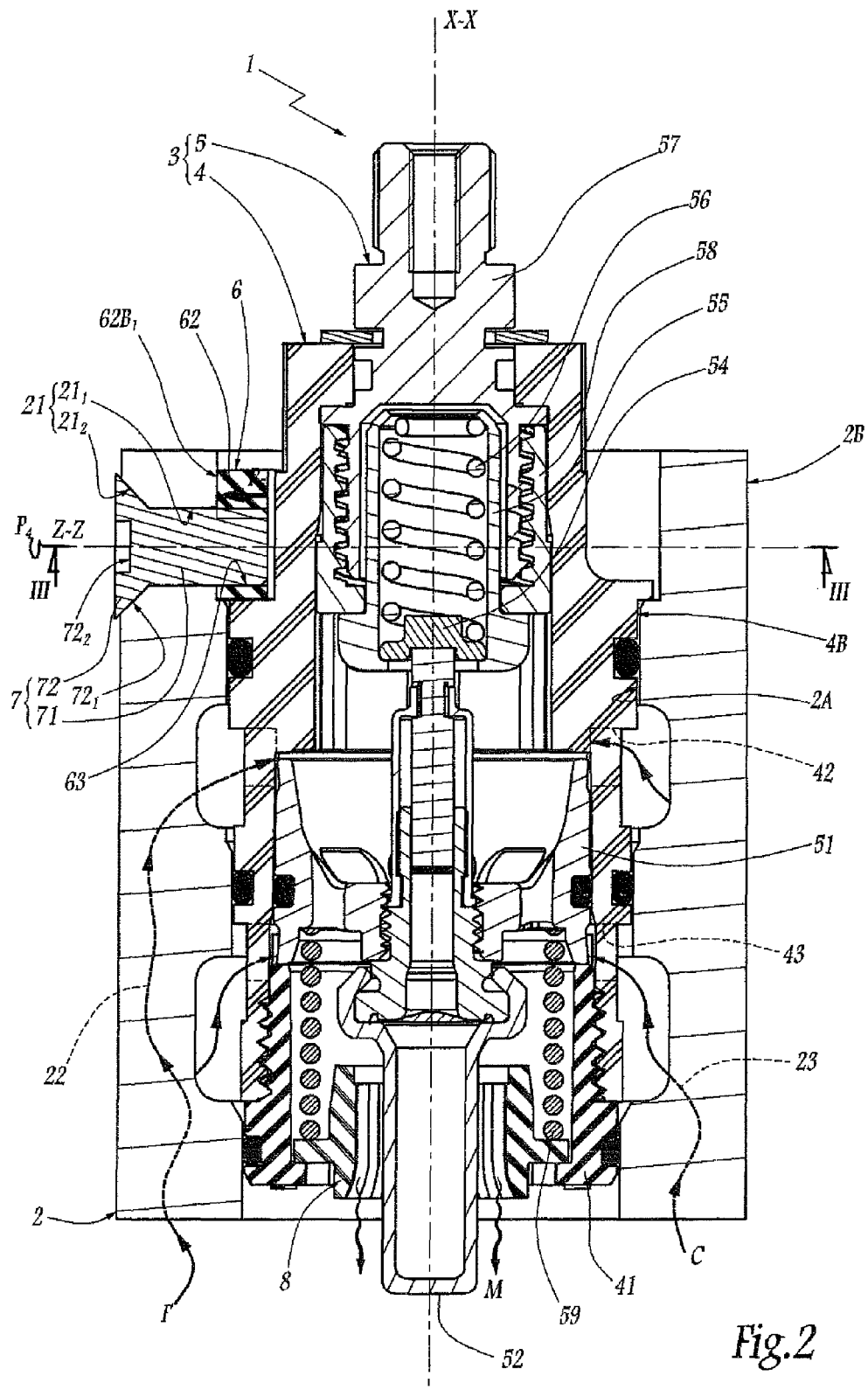
FIG. 2 is the single-unit mixer in longitudinal section on II of FIG. 1.
Figure 3:
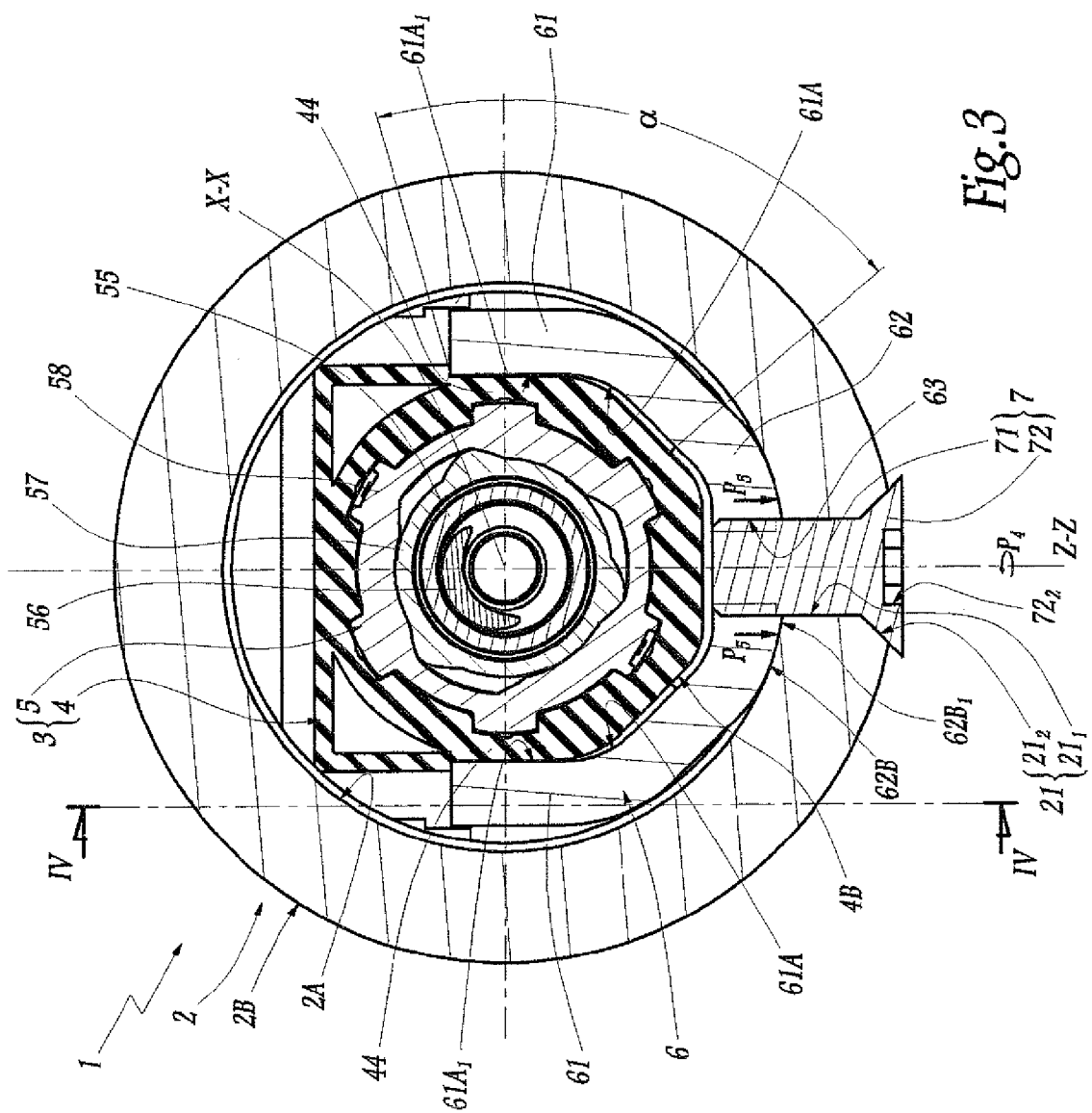
FIG. 3 is the single-unit mixer in cross section on of FIG. 2.
Figure 4:
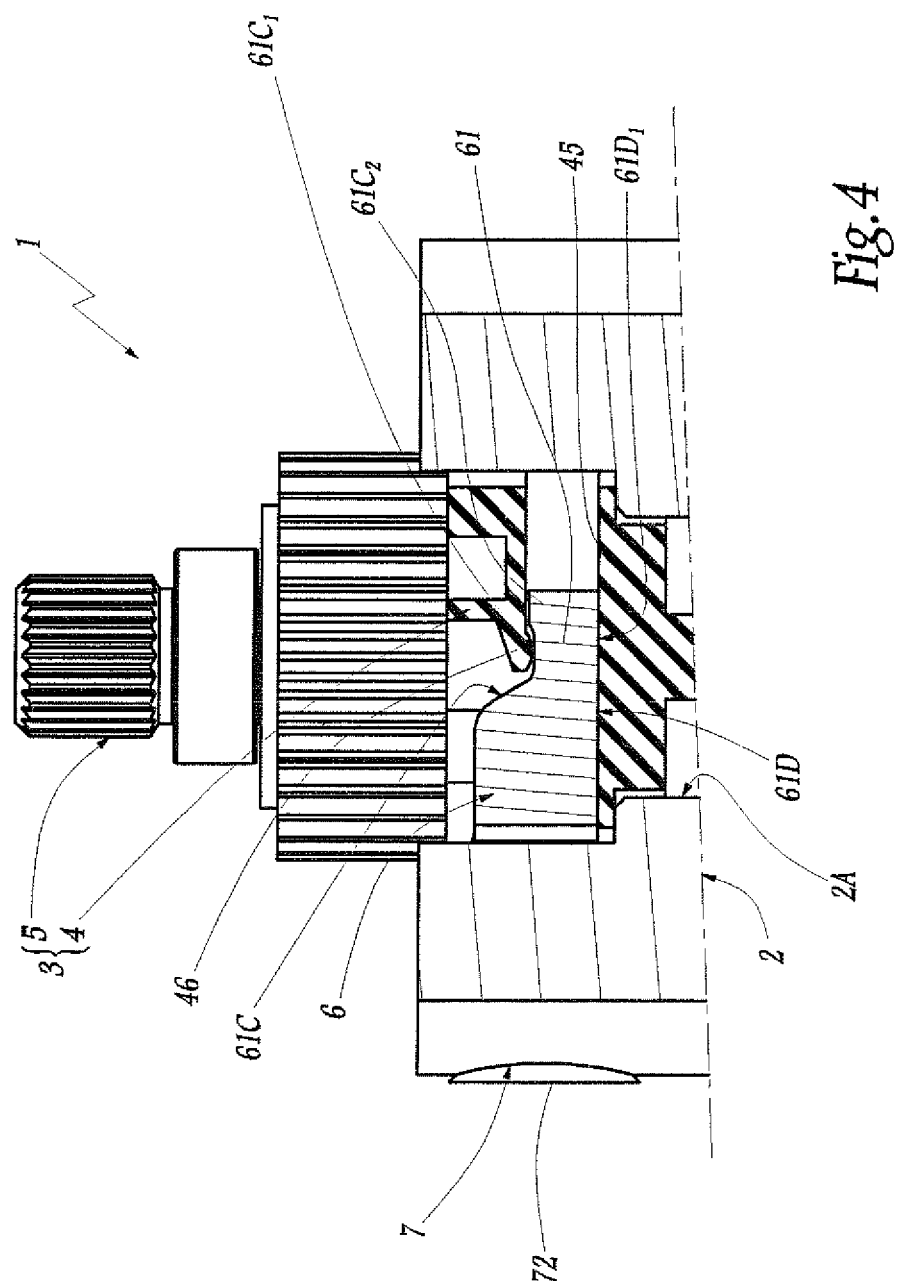
FIG. 4 is the single-unit mixer in longitudinal part-section on IV-IV of FIG. 3.
Figure 5:
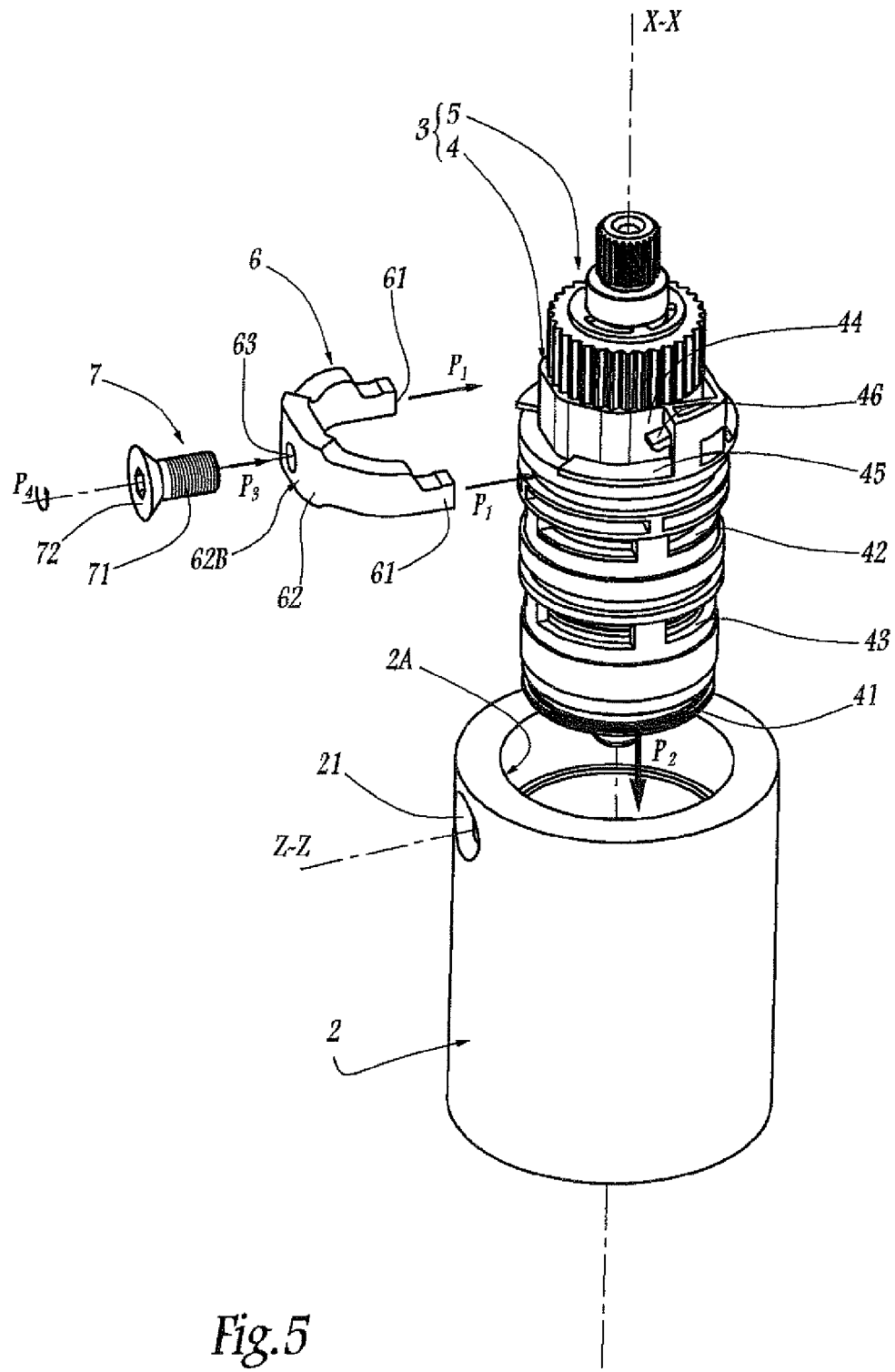
FIG. 5 is an exploded perspective view of the single-unit mixer from the same viewpoint as FIG. 1.

As can be seen clearly in FIGS. 2, 3 and 5, the top part of the mixer casing 2 has a bored hole 21, connecting the interior face 2A and the exterior face 2B of the mixer casing to one another, passing right through it. On the interior side of the hole 21 the latter is delimited by a cylindrical surface $21_1$ on a circular base and centered on an axis Z-Z radial to the axis X-X, whereas, on the exterior side of the hole, the latter is delimited by a frustoconical surface $21_2$, centered on the axis Z-Z and widening outward from the cylindrical surface $21_1$.

The thermostatic single-unit mixer 1 also comprises a thermostatic cartridge 3 which, when the single-unit mixer is in the assembled configuration, is for the most part housed inside the mixer casing 2.

By way of its main external component, the cartridge 3 comprises a shell 4 made of plastic. The shell 4 is of tubular shape and extends lengthways along a central axis substantially coincident with the axis X-X when the cartridge 3 is assembled with the mixer casing 2. At its lower end, the shell 4 is fixedly, in this instance by screw-fastening, equipped with a coaxial sleeve 41 which extends the shell downward. In the exemplary embodiment considered in the figures, the rest of the shell 4 is monobloc, it being understood that, by way of an alternative that has not been depicted, this shell could be made of several parts fixedly secured to one another by any appropriate means, just as the sleeve 41 is fixedly secured to the shell 4.

When the single-unit mixer 1 is in the assembled configuration, the shell 4, including the sleeve 41 thereof, is mounted fluidtightly inside the mixer casing 2, with the radial insertion of seals between the exterior face 4B of the shell and the interior face 2A of the mixer casing, it being noted that these faces 4B and 2A are substantially matched to one another at least on each side of these seals.

The thermostatic cartridge 3 provides regulation for the temperature of the water M leaving the cartridge and obtained by combining incoming hot water C and incoming cold water F. To do this, in a way known per se and as described in detail in FR-A-2 774 740 in the name of the present Applicant, the cartridge 3 comprises ad-hoc thermostatic means 5 housed inside the shell 4.

As clearly visible in FIG. 2, these means 5 comprise a regulating slide 51 mounted such that it can move along the axis X-X between two extreme positions in which it respectively closes off the inlet of hot water and of cold water inlet into the slide. In the two aforementioned extreme positions, the opposite axial ends of the slide 51 press against corresponding seats delimited by the shell 4 and the sleeve 41 respectively. The cold water F and the hot water C reach the slide by passing radially through the shell 4 which for this purpose delimits two respective series of peripheral slots 42 and 43 which can be seen in part in FIG. 5 and have been shown in dotted line in FIG. 2. These slots 42 and 43 are respectively supplied with cold water and with hot water, from outside the shell 4, via ascending passages 22 and 23 delimited in a way known per se, by the casing of the mixer 2 and indicated only in dotted line and schematically in FIG. 2. The quantities of cold water F and of hot water C let into the slide are regulated according to the position of the slide 51 with respect to the shell 4, the combination of these waters forming the outgoing water M.

The position of the slide 51 is controlled by a thermostatic element of which the casing 52, centered on the axis X-X, is fixedly attached to the slide 51. This casing 52 contains a thermally expandable material which, under the action of the heat of the mixed water M in which the casing is immersed, expands and causes a piston 53, centered on the axis X-X, to undergo a relative translational movement along the X-X. The opposite end of the piston 53 to the casing 52 presses against a stop 54 mounted to slide, along the axis X-X, inside a sleeve 55, with the axial interposition of a piston overtravel spring 56. The axial position of the sleeve 55 inside the shell 4, and therefore the altitude of the piston end stop 54, can be adjusted using an adjusting screw 57, which is centered on the axis X-X and the upper end of which is splined so that it can be associated for turning with an operating knob not depicted in the figures. At its lower end, the adjusting screw 57 is threaded to collaborate with a complementary nut 58, centered on the axis X-X, associated with the shell 4 for the purposes of rotating about this axis by splines clearly visible in FIG. 3, and pressing axially downward against the sleeve 55. Thus, when the screw 57 is turned about the axis X-X, the nut 58 effects a translational movement along this axis, causing a corresponding movement of the sleeve 55, it being pointed out that the thermostatic means 5 are supplemented by a return spring 59 which acts on the slide 51 in a way that opposes the movement of the piston 53 relative to the casing 52 of the thermostatic element and which is axially interposed between this slide and the end sleeve 41 of the shell 4.

The structure and operation of the thermostatic means 5 are not described further here, it being understood that the reader can refer to FR A 2 774 740 for such a description.

To immobilize the shell 4 of the cartridge 3 with respect to the mixer casing 2, the single-unit mixer 1 comprises an attachment component 6 and a screw 7 for assembling this component to the mixer casing. As is clearly visible in FIG. 5 the component 6 is in the form of a monobloc fork comprising two parallel branches 61 joined together at one of their longitudinal ends by a bridging piece 62. The component 6 is intended to be interposed between the mixer casing 2 and the shell 4, in such a way that its bridging piece 62 has the axis Z-Z passing through it and that its branches 61 extend lengthwise parallel to the axis Z-Z on each side of the axis X-X. In section transverse to this axis X-X, the component 6 thus has a U-shaped cross section as can be seen quite clearly in FIG. 3.

The component 6 is shaped in such a way that it can be carried mechanically by the shell 4 and can be kinematically connected to the latter both along the axis X-X and in terms of rotation about this axis. For that, the interior face 61A of each branch 61 delimits a flat surface $61A_1$ parallel to the plane containing the axes X-X and Z-Z. As depicted in FIG. 3, this surface $61A_1$ is pressed against complementary exterior flats 44 of the shell 4, these being diametrically opposed with respect to the axis X-X. Flat-flat contact between each of the surfaces $61A_1$ and the corresponding flat 44 provides an effective rotational connection between the shell 4 and the component 6 about the axis X-X.

Further, the lower face 61D of each branch 61 delimits a flat surface $61D_1$ running in a plane perpendicular to the axis X-X. This surface $61D_1$ is pressed axially downward against a complementary stepped part 45 of the shell 4, as can be seen clearly in FIG. 4. The flat-flat contact between the surfaces $61D_1$ and the stepped parts 45 provides an effective connection between the shell 4 and the component 6 in the direction of the axis X-X and downward.

In addition, the upper face 61C of each branch 61 delimits a downward bearing surface $61C_1$ for a resilient pad 46 of the shell 4. This pad 46 is formed as an integral part of the remainder of the shell so that it is elastically deformable, such that when the branch 61 is absent, the pad 46 extends from the rest of the shell toward the corresponding stepped part 45, leaving between these an axial distance slightly smaller than the thickness, that is to say than the dimension in the direction of the axis X-X, of the branch 61 between its surfaces $61C_1$ and $61D_1$. It will thus be appreciated that, when the branch 61 is present, each pad 46 bears axially against the surface $61C_1$, connecting the shell 4 and the component 6 along the axis X-X and upward, and through a resilient effect keeping the surface $61D_1$ bearing against the corresponding stepped part 45.

Furthermore, collaboration between the interior 61A, upper 61C and lower 61D faces of the branches 61 and the parts 44, 45 and 46 of the shell 4 allow the component 6 to be mobile along the axis Z-Z with respect to the shell 4, in sliding. Advantageously, in order to allow the component 6 to be carried by the shell 4 in this mobile manner, while at the same time preventing it from coming free accidentally if the cartridge 3 is angled with respect to the vertical, the upper face 61C of each branch 61 delimits, at its free end, a heel $61C_2$ projecting upward with respect to the level of the surface $61C_1$. By butting against the corresponding pad 46 in the direction of the axis Z-Z this heel $61C_2$ blocks the outward movement of the component 6 and prevents it from coming free.

The bridging piece 62 of the component 6 delimits a tapping 63 centered on the axis Z-Z and passing right through the bridging piece.

The screw 7 has a threaded shank 71 the screw thread of which complements the tapping 63 and which has a maximum diameter equal to or slightly smaller than the interior diameter of the surface $21_1$ of the hole 21. The screw 7 also comprises, at one longitudinal end of its shank 71, a countersunk head 72 that is broader than the shank 71. On its side facing toward the shank 71, the head 72 delimits a frustoconical surface $72_1$ that complements the surface $21_2$ of the hole 21. On its opposite side, the head delimits a polygonal socket $72_2$ intended to accept the head of a tool used to turn the screw.

The manufacture of the thermostatic single-unit mixer 1 is as follows.

Initially, the components of the single-unit mixer 1 are in a configuration similar to that illustrated in FIG. 5. There are therefore: the mixer casing 2; the cartridge 3 in the form of a preassembled assembly that can be handled as a single unit; the component 6; and the screw 7.

First of all, the component 6 is assembled with the cartridge 3, positioning its branches 61 on each side of the flats 44 and introducing them between the stepped parts 45 and the pads 46, as indicated by the arrows $P_1$ in FIG. 5, until the heels $61C_2$ protrude beyond the pads 46 in the direction of the axis Z-Z. Before or after having thus attached the component 6 to the cartridge 3, a temperature-regulating knob, not depicted, is advantageously attached to the spliced upper end of the adjusting screw 57: because the component 6 is associated for rotation with the shell 4, this component forms a reference for angular indexing about the axis X-X, allowing the aforementioned knob to be assembled with the cartridge 3 quickly and accurately.

Next, the cartridge 3, possibly fitted with the temperature-regulating knob, and the component 6 carried by the cartridge are introduced into the casing of the mixer 2, generally speaking along the axis X-X, for example introducing via the upper end of the casing of the mixer, as indicated by the arrow $P_2$ in FIG. 5.

The cartridge is then fitted into the casing of the mixer in such a way that the hole 21 opens internally into the tapping 63 coaxially. It will thus be appreciated that, because the component 6 rotates as one with the shell 4, this component angularly indexes the cartridge 3 inside the mixer casing 2 about the axis X-X.

In this configuration, the close fit between the interior face 2A of the mixer casing 2 and the exterior face 4B of the shell 4, at least at the seals interposed between them, immobilizes the shell with respect to the mixer casing in all directions radial to the axis X-X, notably along the axis Z-Z.

Thirdly, the shank 71 is introduced, from outside the mixer casing 2, into the hole 21 as indicated by the arrow $P_3$ in FIG. 5. Then, by turning the screw 7 as indicated by the arrow $P_4$ in FIGS. 2, 3 and 5, the screw thread of the shank 71 is engaged in the tapping 63. This screwing brings the head 72 into abutment against the exterior face 2B of the mixer casing 2, by additional engagement of the surfaces $72_1$ and $21_2$. By then continuing to tighten the screw 7, the shank 71 drives the tapping 63, and as a result the entire component 6, in a translational movement along the axis Z-Z away from the axis X-X. The component 6 then slides, in the direction of the axis Z-Z, against the flats 44 on its interior side, against the stepped parts 45 on its lower side, and against the pads 46 on its upper side. The exterior face 622 is thus moved toward the interior face 2A of the mixer casing until a surface $62A_1$ delimited by this face 62A is pressed firmly against the face 2A, as indicated by the arrows $P_5$ in FIGS. 2 and 3. In other words, the wall of the mixer casing 2 surrounding the hole 21 is thus trapped, along the axis Z-Z, between the bridging piece 62 of the component 6 and the head 72 of the screw 7. The mixer casing 2 and the component 6 are thus rigidly attached to one another, as indicated in FIGS. 1 to 4, thus immobilizing the shell 4 inside the mixer casing in all directions.

This rigid connection between the component 6 and the mixer casing 2 is advantageously such that, when combined with the rigid structure of this component, the latter contributes to blocking the shell 4 of the cartridge 3 in terms of rotation about the axis perpendicular both to the axis X-X and to the axis Z-Z. The cartridge 3 is thus better immobilized inside the mixer casing 2.

When the single-unit mixer 1 is in operation, the static and dynamic pressure phenomena inside the mixer casing 2, which on the whole act along the axis X-X and upward, that is to say which tend to make the cartridge 3 move up in relation to the mixer casing, are spread by the component 6 at the contact between the surfaces $61D_1$ and the stepped parts 45, that is to say over a wide contact area because each of these surfaces $61D_1$ collaborates with the shell part 45 over an angular sector α, centered on the axis X-X, of at least 20° as indicated in FIG. 3. In that way, the single-unit mixer 1 is able to tolerate severe operating conditions with no damage either to the shell 4 or its fixed attachment to the mixer casing 2.

If the cartridge 3 has to be changed, all that is required is for the screw 7 to be removed by unscrewing it and for the cartridge, possibly fitted with the temperature-regulating knob, to be replaced as a single unit. A new cartridge is then fitted, just as quickly and easily as the original cartridge was. Hence, performing maintenance operations on the single-unit mixer 1 does not entail lengthy and complicated adjustments nor does it require special tooling or any specialist training.

Various modifications and variations of the thermostatic single-unit mixer 1 described hereinabove, and to the method of manufacturing it, are also conceivable. By way of examples:

the presence of the attachment component 6 and of the screw 7 does not introduce any significant constraint with regard to the thermostatic cartridge 3, which means that the latter can incorporate known arrangements; for example, a turbulator 8 may be provided around the casing 52 of the thermostatic element see FIG. 2);

the geometry of the mixer casing 2 is not restricted to a cylindrical geometry in as much as, in general, all that is needed is a shape that is hollow and elongate, that creates an interior face 2A against which the component 6 can bear rigidly and which can accommodate the shell 4 with a locally close fit; in particular, the exterior face 2B of the mixer casing may have very diverse geometries, particularly according to the esthetics of the pipe fittings to which this mixer casing belongs;

one non-depicted alternative form of the elastic pads 46 is for each of these pads to be replaced by a rigid bulge sized in order forcibly to overcome a local additional thickness of the upper face 61C of the corresponding branch 61 when the latter is assembled with the shell 4; the overcoming of this additional thickness, analogous to the heel 61C$_2$, thus constitutes a "hard point" which when overcome at the time of assembling the component significantly limits the risk of this component subsequently becoming disengaged;

one alternative, which has not been depicted, of an arrangement for the interior face of the component 6, to prevent this component from rotating with respect to the shell 4, is for the shell to be fixedly fitted with a stud projecting from its exterior face 4B and housed in a complementary housing delimited in the interior face of the bridging piece 62 when the component 6 is assembled with the cartridge 3; and/or shapes other than that of a fork are possible for the attachment component 6; in particular, this component may have the shape of an annulus or of a washer and, more generally, may have a rigid structure that has a tapping analogous to the tapping 63 and which runs in the direction of the axis Z-Z at least on one side of the axis X-X.

The invention claimed is:

1. A thermostatic single-unit mixer, comprising:
a mixer casing of tubular overall shape,
a thermostatic cartridge, which constitutes a preassembled assembly attached inside the mixer casing and which comprises a hollow shell made of plastic, accommodating thermostatic means for regulating the temperature of a fluid leaving the cartridge and being obtained by mixing a cold incoming fluid with a hot incoming fluid, and
attachment means for attaching the shell to the mixer casing, wherein the attachment mean comprise, firstly, a screw provided with a threaded shank and with a widened end head, and, secondly, a rigid component which is interposed between the mixer casing and the shell such that this rigid component can move along an axis of movement transverse to the longitudinal axis of the mixer casing, this rigid component being kinematically linked to the shell both in the direction of the axis of the mixer casing and in terms of rotation about this axis, and which is equipped with a tapping which is centered on the axis of movement, which opens onto one face of the rigid component, which faces toward the mixer casing, and which is able to engage by screw fastening with the threaded shank in order to move the rigid component until a bearing surface of this face is pressed firmly against the interior face of the mixer casing when the screw is introduced, from outside the mixer casing, through a transverse through-hole of the mixer casing, this through-hole being smaller than the head of the screw.

2. The single-unit mixer as claimed in claim 1, wherein the rigid component is adapted to be assembled and carried by the shell before the cartridge is attached inside the mixer casing.

3. The single-unit mixer as claimed in claim 1, wherein the single-unit mixer further comprises a temperature-regulating knob, attached fixedly to the thermostatic means, and wherein the rigid component can be assembled and carried by the shell before the temperature-regulating knob is attached to the cartridge.

4. The single-unit mixer as claimed in claim 1, wherein the rigid component delimits on its opposite face to the interior face of the mixer casing, at least one bearing surface for bearing against a corresponding part of the shell, said at least one bearing surface being designed both to connect the rigid component to the shell in terms of rotation about the longitudinal axis of the mixer casing and to slide against said corresponding part of the shell in the direction of the axis of movement.

5. The single-unit mixer as claimed in claim 1, wherein the rigid component delimits, on each of its two opposite faces in the direction of the longitudinal axis of the mixer casing, at least one bearing surface for bearing against a corresponding part of the shell, said at least one bearing surface being designed both to connect the rigid component to the shell in the direction of the longitudinal axis of the mixer casing and to slide against said corresponding part of the shell in the direction of the axis of movement.

6. The single-unit mixer as claimed in claim 5, wherein the at least one bearing surface surface delimited by one of said two opposite faces of the rigid component collaborate with the corresponding part of the shell over an angular expanse of at least 40° about the longitudinal axis of the mixer casing.

7. The single-unit mixer as claimed in claim 5, wherein one of said corresponding parts of the shell is deformable with respect to the rest of the shell, so that it can be pressed against the at least one bearing surface with pre-load in the direction of the longitudinal axis of the mixer casing.

8. The single-unit mixer as claimed in claim 1, wherein the rigid component is equipped with locking means designed to retain the rigid component with respect to the shell in the direction of the axis of movement in the absence of the mixer casing.

9. The single-unit mixer as claimed in claim 1, wherein the rigid component has a forked overall shape, with two parallel branches running lengthways in the direction of the axis of movement and a bridging piece which connects the two branches together at one of their longitudinal ends and which is equipped with the tapping and with the bearing surface for bearing against the interior face of the mixer casing.

10. A method of manufacturing a thermostatic single-unit mixer in which are provided :
a mixer casing of tubular overall shape, and
a thermostatic cartridge, which constitutes a preassembled assembly and which comprises a hollow shell made of plastic, accommodating thermostatic means for regulating the temperature of a fluid leaving the cartridge obtained by mixing a cold incoming fluid with a hot incoming fluid, wherein a rigid component is interposed between the mixer casing and the shell, being attached inside the latter, so as to be able to move along an axis of movement transverse to the longitudinal axis of the mixer casing, while at the same time kinematically connecting this rigid component to the shell both in the direction of the axis of the mixer casing and in terms of rotation about this axis, and wherein a screw is then introduced into the mixer casing, through a transverse through-hole of the mixer casing, this through-hole being smaller than a head of this screw, and a threaded shank of the screw is screwed into a tapping in the rigid component, which is centered on the axis of movement and which opens onto a face of this component that faces toward the mixer casing, until a bearing surface of this face is pressed firmly against the interior face of the mixer casing.

* * * * *